No. 673,703. Patented May 7, 1901.
L. H. DAVIS & J. D. DOYLE.
DOOR GUARD.
(Application filed Sept. 24, 1900.)
(No Model.)

Witnesses
Oliver B. Kaiser
Pearl McMichael

Inventors
Lyman H. Davis  John D. Doyle
By Wood & Wood
Attorneys

THE NORRIS PETERS CO., PHOTO-LITHO., WASHINGTON, D. C.

UNITED STATES PATENT OFFICE.

LYMAN H. DAVIS, OF NEWPORT, KENTUCKY, AND JOHN D. DOYLE, OF NASHVILLE, TENNESSEE.

DOOR-GUARD.

SPECIFICATION forming part of Letters Patent No. 673,703, dated May 7, 1901.

Application filed September 24, 1900. Serial No. 30,916. (No model.)

*To all whom it may concern:*

Be it known that we, LYMAN H. DAVIS, residing at Newport, in the county of Campbell and State of Kentucky, and JOHN D. DOYLE, residing at Nashville, in the county of Davidson and State of Tennessee, citizens of the United States, have invented certain new and useful Improvements in Door-Guards, of which the following is a specification.

Our invention relates to an improved door-guard for stalls, one object being to provide a perfectly sanitary guard admitting of perfect air circulation and light.

Another object of our invention is that the guard shall be of flexible material, thus preventing injury to the animal and allowing the guard to be readily erected and removed and to be shipped "knockdown."

Another object of our invention is to make this guard cheap and durable and also to make it adjustable, to be used with different-width stalls.

The features of our invention are more fully set forth in the description of the accompanying drawings, forming a part of this specification, in which—

Figure 1:
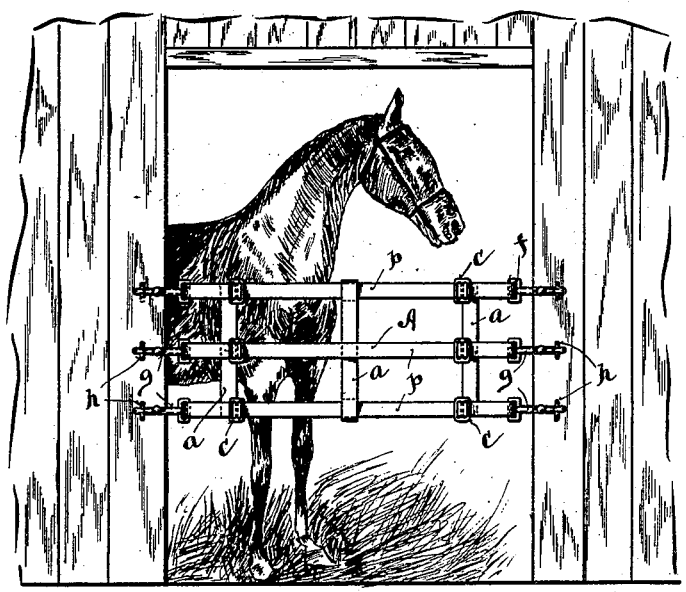
Figure 2:
Figure 3:
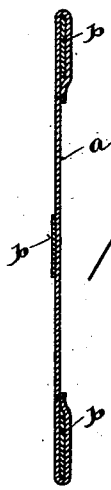

Figure 1 is a front view of our invention, showing our improved guard in one of its positions for use. Fig. 2 is a sectional view of one of the strips of the guard, illustrating another position of attachment. Fig. 3 is a sectional view of one of the cross-strips.

This guard is more particularly designed for use in stalls to be occupied by race-horses, in which the greatest precautions are always exercised to provide perfect sanitation and to eliminate all possible elements of danger to the animal.

This improved guard may be used either in connection with the ordinary stall-door or separately. When separately used it may be attached to the sides of the stall, as shown in Fig. 1; but the preferred method is to attach the guard to the inside of the door-jamb, as shown in Fig. 2.

Our improved guard A preferably consists of strips of webbing interlaced, woven, or crossed in any desired manner to suit the vertical and horizontal dimensions which may be desired. In the form shown, $a$ represents vertical strips of webbing, and $b$ horizontal strips of webbing. The ends of the horizontal strips are passed through the slides $c$, passing around the central tie-rod $d$ of said slides. The ends of the horizontal strips are then passed through the eyes $f$ of the snap-hooks $g$. Other suitable fastening devices having an eye on the inner ends could be employed. The ends of these horizontal strips are then turned back and secured, respectively, to the vertical strips at each side of the guard and to the tie-rods $d$ of the slides $c$. $h$ represents ordinary eyelets screwed or stapled into the door-jamb of the stall upon each side, with which the snap-hooks engage. The ends of the horizontal strips are thus converted into loops $i$, containing the snap-hooks, the length of the loops being varied by manipulating the slides to give greater or less width of guard, according to the width of the door to which the guard is to be applied.

When it is desired to open this guard, the fastening devices upon one side are detached, whereupon the guard will collapse and be suspended by the fastening devices on the other side out of the way and offering no impediment or element of danger in the stall. It is obvious that this idea could be applied to the vertical strips of webbing, so that it could be adjustable both ways or only in one direction, as desired.

There are many advantages arising from the use of this guard which will be readily appreciated by persons employed in keeping fine animals, the combined strength, cheapness, lightness, durability, freedom from danger, and flexibility contributing to make what we regard as vastly superior to any stall-door guard ever before put into use.

Having described our invention, we claim—

1. A stall-door guard composed of strips of webbing stretched horizontally across the stall-door, transverse strips of webbing attached to the horizontal strips at their points of intersection, a series of fastening devices upon each side adapted to engage with a series of eyelets secured to the sides of the stall, substantially as specified.

2. A stall-door guard composed of strips of webbing stretched horizontally across the stall-door, transverse strips of webbing attached to the horizontal strips at their points of intersection, the ends of said horizontal strips being provided with loops, a series of fastening devices slidably secured to the loops and adapted to engage with a series of eyelets in the sides of the stall, and means for adjusting the length of said loops, substantially as specified.

3. A stall-door guard composed of strips of webbing stretched horizontally across the stall-door, transverse strips of webbing attached to the horizontal strips at their points of intersection, a series of slides provided with eyelets adjustably secured to the horizontal strips, and a series of eyelets attached to the sides of the stall-door adapted to be engaged by the said adjustable eyelets, whereby the device may be applied to stalls of various lateral dimensions, substantially as specified.

4. A stall-door guard composed of strips of webbing stretched horizontally across the stall-door, transverse strips of webbing attached to the horizontal strips at their points of intersection, said horizontal strips having adjustable slides and fastening devices secured to the ends thereof, and a series of eyelets attached to each side of the stall-door adapted to be engaged by the said fastening devices, substantially as specified.

In testimony whereof we have hereunto set our hands.

LYMAN H. DAVIS.
JOHN D. DOYLE.

Witnesses:
OLIVER B. KAISER,
PEARL MCMICHAEL.